United States Patent [19]

Reilly

[11] Patent Number: 5,119,543
[45] Date of Patent: Jun. 9, 1992

[54] DEVICE AND METHOD TO VARY AXLE ORIENTATION

[75] Inventor: Bruce J. Reilly, Lots B&C Cambell Street, Narellan, New South Wales 2567, Australia

[73] Assignees: Bruce John Reilly; Joyce Lynette Reilly, both of New South Wales, Australia

[21] Appl. No.: 540,009

[22] Filed: Jun. 19, 1990

[30] Foreign Application Priority Data

Jun. 19, 1989 [AU] Australia .................. PJ4813

[51] Int. Cl.⁵ .................. B21F 35/00; B23P 13/00; B23P 6/00
[52] U.S. Cl. .................. 29/173; 29/402.01; 280/661; 280/669; 280/718; 403/4
[58] Field of Search .............. 280/715, 718, 719, 688, 280/660, 661, 669; 29/173, 402.01; 384/281, 295; 403/4, 162

[56] References Cited

U.S. PATENT DOCUMENTS

| | | | |
|---|---|---|---|
| 3,687,477 | 8/1972 | Miller | 280/681 |
| 4,042,260 | 8/1979 | Youmans | 280/721 |
| 4,375,903 | 3/1983 | Lovell | 280/104 |
| 4,500,110 | 2/1985 | McWhorter | 280/680 |
| 4,640,007 | 2/1987 | Hydorn | 29/426.4 X |
| 4,645,161 | 2/1987 | Collins | 248/439 |
| 4,846,495 | 7/1989 | Laidely | 280/680 |
| 4,968,055 | 11/1990 | Reilly | 280/661 |
| 4,991,868 | 2/1991 | VanDenberg | 280/711 |

Primary Examiner—Timothy V. Eley
Attorney, Agent, or Firm—Fleit, Jacobson, Cohn, Price, Holman & Stern

[57] ABSTRACT

An insulator block (10) for use with vehicle suspension systems particularly camel-back truck suspension systems. The insulator block (10) comprises a resilient base (12), locating pin (13) and a ring (14) with an eccentric aperture (15). The eccentric aperture (15) receives locating pin (13) the outer circumference of ring (14) mates with an aperture in the leaf spring of the suspension system. The insulator block (10) connects the leaf spring of the suspension system to the drive axle of the vehicle via a hollow box unit (5). The position of the hollow box unit (5) and vehicle axle to the leaf spring may be adjusted by using rings (14) with different eccentric apertures (15) on the locating pin (13). The rings (14) are normally held in place on the locating pin (13) by tack or spot welding.

12 Claims, 2 Drawing Sheets

DEVICE AND METHOD TO VARY AXLE ORIENTATION

BACKGROUND OF THE INVENTION

This invention relates to a method and device of varying the axle orientation of camel-back suspension systems, in particular Mack tandem drive camel-back suspensions.

These types of camel-back suspension systems utilise rubber or polyurethane insulator blocks, which not only dampen the movement between the suspension and axle, but position and retain the axle relative to the chassis.

The Mack tandem drive camel-back suspension system is fitted to the majority of both onroad and offroad Mack trucked throughout the world, and is a proven and reliable rear end suspension system.

In recent years there has been a greater awareness of heavy vehicle operation on our roads, leading to increased road authority controls and tighter inspection and safety procedures. Also, the cost of operating heavy vehicles has increased rapidly. Fuel, tire and repair costs are now the major expense when running heavy vehicles.

The correct alignment of the wheel/axle assembly in relation to the vehicle chassis longitudinal centre line is a major factor in determining not only running costs of heavy vehicles, but the safety and driveability of such heavy vehicles. This is particularly true of the rear end of tandem drive camel-back suspension systems.

Any condition other than correct alignment of the rear end with the vehicle chassis longitudinal centre line can contribute to rear axle "steer". Misalignment of the drive/rear axle contributes to an off-thrust angle which, in order to maintain vehicle direction, must be offset by constant steering correction by the driver. This constant steering correction places the front steer tires at a "scrub" angle to the direction of movement, contributing to a rapid wear of the tires, particularly to the new generation radial construction tires. Similarly, the drive/rear tires are also running at an angle to the direction of movement of the truck and experience excessive wear. Therefore, all tires on the vehicle are being "scrubbed" thus experiencing rapid wear.

Recent investigations by Hunter Engineering U.S.A. revealed that an estimated 70% of heavy vehicles on the road are misaligned. This misalignment leads to rapid tire wear which is a major consideration contributing to increased fuel consumption. In fact, studies have shown that tire rolling resistance contributes over 42% to the overall vehicle energy consumption.

Clearly, there is a need for a simple and inexpensive method for varying axle orientation of camel-back suspension systems.

There have been, over the years, several methods of adjusting the drive/rear axle of heavy vehicles originally not fitted with any adjustment means, e.g., the Hendrickson beam system. The camel-back suspension system, in particular, can be adjusted using a one-eighth inch offset insulator block available from the original equipment manufacturer or several after market manufacturers. This insulator block is identical to the standard insulator block in that it comprises the rubber or polyurethane base and a pin which locates the insulator block in a leaf spring. However, the locating pin is placed at one-eighth inch offset from the centre line of the block. Any axle adjustment which is obtained from this offset insulator block is, however, very limited as there is no provision for any adjustment other than one-eighth of an inch fore and aft. Additionally the "upper block" in the paired arrangement is not offset the one eighth of an inch and is hence less effective in the offset obtained. In the vehicle alignment industry an offset of one eighth of an inch is not worthwhile particularly for heavy vehicles.

Other forms of adjustment include simply removing the locating pin of a standard insulator block and rewelding the locating pin in an appropriate offset location. Alternatively, the locating pin can be cut down on one side and rewelded on the other side so as to provide an appropriate offset.

These adjustment procedures are not only crude, but do not allow for any re-alignment or offset adjustment at a later date. The effect of the welding and resultant heat, severely affects the rubber bonding of the locating pin thereby contributing to premature block failure.

The prior art adjustment methods also do not allow for a wider incremental adjustment. Varying manufacturing techniques, increased production runs and a desire to lower the cost per unit with the widest variation of component tolerances possible, have all combined to create the need for an adjustment means of the critically positioned wheel/axle assemblies which can cope with these wider manufacturing tolerances, and yet improve axle alignment techniques.

SUMMARY OF THE INVENTION

The present invention seeks to ameliorate the disadvantages of the prior art while providing a method and apparatus for varying the axle orientation of camel-back suspension systems with an incremental adjustment means over a wider range.

The present invention therefore comprises a system for altering axle orientation of a camel-back suspension arrangement, said suspension arrangement comprising a leafed spring, a hollow box unit attached to said axle and an insulator block comprising resilient base means, said block being held by said hollow box unit and resiliently connecting said leafed spring with said axle, said system comprising a locating pin projecting from the resilient base means eccentrically of the in-use vertical axis of said resilient base means and a ring having an eccentric aperture therethrough for receipt of said locating pin, the outer circumference of said ring mating with an aperture in said leafed spring such that in use said system is adjustable to alter the position of said resilient base means and said axle relative to said leafed spring.

The present invention also comprises a method for altering axle orientation of a camel-back suspension arrangement, said suspension arrangement comprising a leafed spring, a hollow box unit attached to said axle an insulator block, held by said box unit, resiliently connecting said leafed spring to said axle, said insulator block comprising a resilient base means, a locating pin and a ring, wherein said locating pin projects from said resilient base means eccentrically of the in-use vertical axis of said resilient base means, said ring having an eccentric aperture therethrough for receipt of said locating pin, the outer circumference of said ring mating with an aperture of a leafed spring, said method comprising placing the ring over said locating pin and inserting the insulator block into the leafed spring, thereby altering the position of said resilient base means and said axle relative to said leafed spring.

The present invention also comprises an insulator block set for altering axle orientation of a camel-back suspension arrangement, said set comprising a resilient base means, a locating pin projecting from said resilient base means eccentrically of the in-use vertical axis of said resilient base means and at least one ring, said ring having an eccentric aperture therethrough for receiving said locating pin and an outer circumference for closely fitting an aperture in a leafed spring of said suspension arrangement.

The popular Mack camel-back suspension system in particular can considerably benefit from the extended incremental adjustment means of the inventive method and apparatus, which contributes vastly to improved roadability, safety, tire life, driver satisfaction and reduced fatigue, lowered operating costs, reduced fuel usage, increased mechanical component life and other related issues. The wheel alignment service industry also benefits by having an engineered and ready means to provide rear end alignment rapidly and cheaply and yet still provides for a small inventory. The distributors and service agents for OEM (original equipment manufacturers) can professionally "engineer" a reliable means of overcoming mismatched componentry and wide manufacturing tolerances without the time-consuming and costly removal of major componentry, such as spring packs.

This is especially true where the OEM exports the vehicle to another country. It is not possible, in this case, for the OEM to fully cater for the conditions of vehicle alignment in the final country of assembly or the area of operation of the vehicle. By the use of the inventive method and apparatus, the distributor or service agent may simply align the rear end of the vehicle in accordance with the guidelines laid down by the manufacturer without any direct involvement from the manufacturer.

Similarly, the inventive method and apparatus will be of considerable benefit to the aftermarket repair industry where the popularity of the camel back suspension system is proven. Vehicles "in use" are subject to replacement suspension componentry where mismatching, collision damage, fitment of poor non-standard parts etc., which results in misalignment of axle assemblies and poor "alignment condition".

In a particularly preferred embodiment, the insulator block is produced with the locating pin being eccentric by 4 mm from the in-use vertical axis of the resilient base means, with a set of rings with apertures set at between 0 and 6 mm eccentric from centre.

In another particularly preferred embodiment, the locating pin is similarly eccentric by 5 mm with a group of rings having apertures at 1, 3 and 5 mm eccentric from centre.

Both these embodiments produce a range of offsets from 0-10 mm with increments of 2 mm.

BRIEF DESCRIPTION OF THE DRAWINGS

A preferred embodiment of the invention will now be described, by way of example, with reference to the accompanying drawings in which.

DETAILED DESCRIPTION OF THE DRAWINGS

Figure 1:
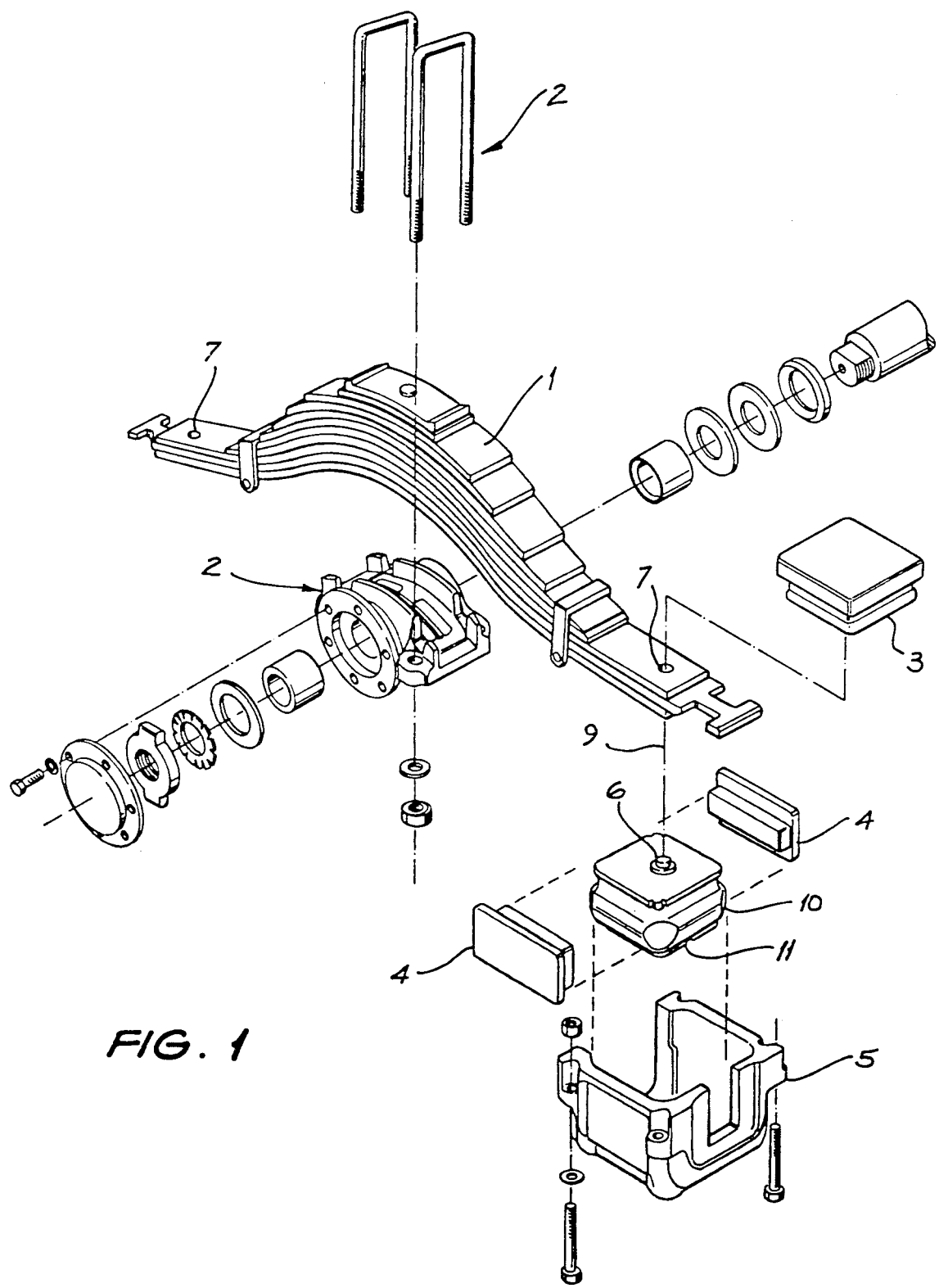
FIG. 1 is a perspective view of one side of a rear end tandem drive Mack camel-back suspension system.

Referring firstly to FIG. 1, a standard camel-back suspension system is shown where a leafed spring 1 is attached to the vehicle chassis via mounting system 2. At either end of the leafed spring are apertures 7, which receive the locating pin 6 of the insulator block 10. Upper insulator block 3 also has a locating pin (not shown) which is received in aperture 7.

Insulator block 10 is received in hollow box unit 5 which is attached to the vehicle drive axle (not shown). Only one hollow box unit 5 is shown in FIG. 1. However, it should be clear to those skilled in the art that another hollow box unit and accompanying axle is located at the other end of the leafed spring 1. It should also be noted that a mirror image of this suspension system is in place on the other side of the vehicle.

The insulator block 10 is firmly held in the hollow box unit 5 by means of spacers 4 and, in this case, the contoured lower surface 11 of the insulator block 10, which mates with a contoured base of the hollow box unit 5, in order to prevent any lateral movement of the insulator block 10.

It is clear therefore that the insulator block 10 resiliently connects the leafed spring 1 to the drive axle of the vehicle (not shown) via the hollow box unit 5.

Normally, the insulator block comprises a locating pin 6 with an outer diameter of 1¾ inches. This locating pin 6 is positioned on the in-use vertical axis 9 of the insulator block 10 and fits in aperture 7 of the leafed spring 1.

Any adjustment of the position of the leafed spring 1 relative to the hollow box unit 5 has previously entailed the replacement of a standard insulator block with an insulator block with a locating pin eccentric from the in-use vertical axis by one-eighth of an inch or required the removal and relocation of the entire locating pin. Not only do these prior art methods offer limited adjustment in the former case, but are time consuming, crude and unreliable in the latter. They are also not altogether compatible with currently existing alignment techniques.

Figure 2:
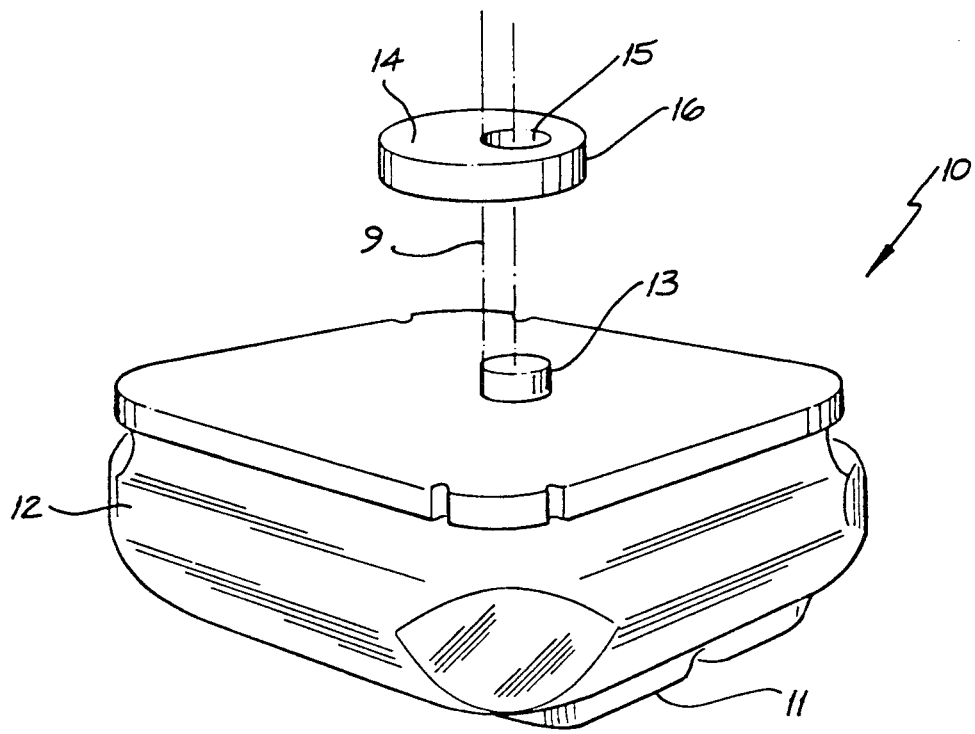
FIG. 2 is a perspective view of the inventive insulator block.
Figure 3:
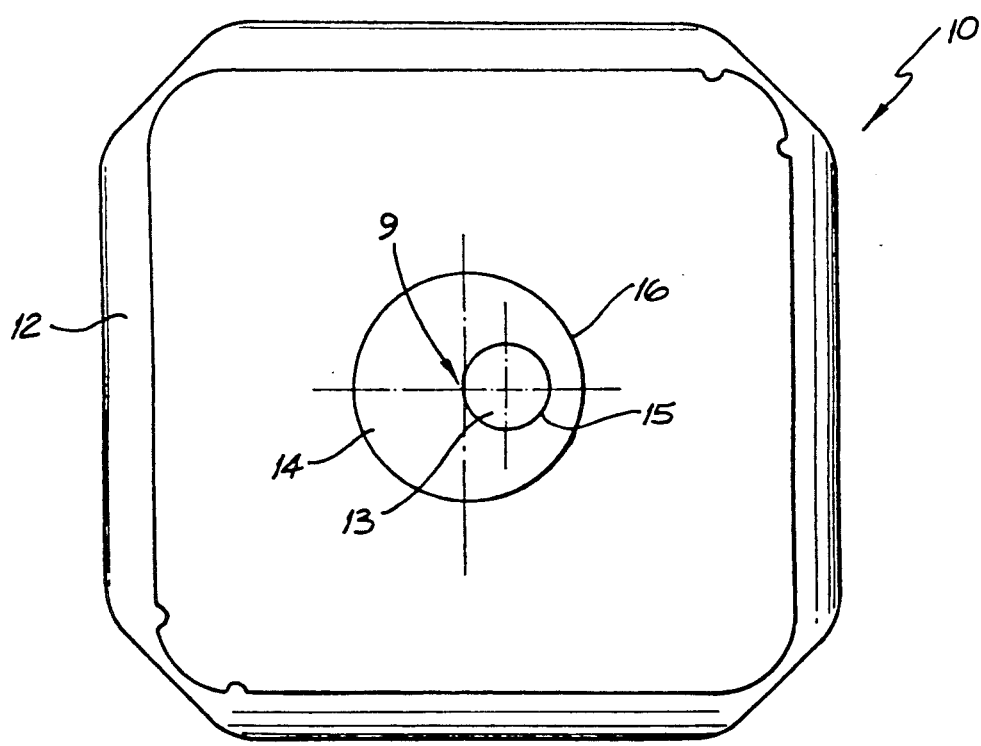
FIG. 3 is a plan view of the inventive insulator block of FIG. 2.

FIGS. 2 and 3 show a preferred embodiment of an insulator block 10 according to the present invention.

This inventive insulator block comprises a resilient base means 12, usually constructed of rubber or polyurethane, a locating pin 13, usually of 1 inch diameter, slightly eccentric from the in use vertical axis 9 of the resilient base means 12 and a ring 14.

The ring 14 has an eccentric aperture 15 therethrough, for receipt of the locating pin 13. The outer circumference 16 of the ring 14 is receivable in the aperture 7 of the leafed spring 1 (see FIG. 1). This outer diameter 16 of the eccentric ring 14 is usually in the order of 1¾ inches. It should be clear to those skilled in the art that, when the inventive insulator block 10 is placed in the camel-back suspension system shown in FIG. 1, the position of the leafed spring 1 relative to the hollow box unit 5 can be altered by a total eccentric resulting from the eccentric of the locating pin 13 and eccentric aperture 15 of ring 14. It is also envisaged that several rings with differing eccentric apertures be available with the insulator block so as to further vary the amount of adjustment between the leafed spring 1 and the hollow box unit 5.

For example, an insulator block may have a locating pin eccentric by 4 mm. Several rings with apertures set at 0, 2, 4 and 6 mm eccentric from centre would then be used in conjunction with this locating pin to give a total eccentric as outlined hereafter in Table 1.

TABLE 1

Locating pin of 4 mm eccentric

| Eccentric Aperture Offset (mm) | Total Eccentric (mm) |
|---|---|
| 0 | 4 ± 0 = 4 |
| 2 | 4 ± 2 = 2 or 6 |
| 4 | 4 ± 2 = 0 or 8 |
| 6 | 4 ± 6 = 2 or 10 |

It is to be noted that 10 mm is the maximum eccentric shown in Table 1. This figure has been found, by the applicants, to be a preferable maximum eccentric that can be reliably incorporated into the camel-back suspension system at present. It is, however, envisaged that there may be occasion to use an eccentric of greater than 10 mm.

Another alternative to the 4 mm eccentric locating pin and accompanying rings shown above is the use of a 5 mm eccentric locating pin and three rings with apertures set at 1, 3 and 5 mm eccentric, giving a total eccentric as outlined in Table 2.

TABLE 2

Locating pin of 5 mm eccentric

| Eccentric Aperture Offset (mm) | Total Eccentric (mm) |
|---|---|
| 1 | 5 ± 1 = 4 or 6 |
| 3 | 5 ± 3 = 2 or 8 |
| 5 | 5 ± 5 = 0 or 10 |

As is clear from both tables, either set up gives a range of adjustment from 0–10 mm in 2 mm increments. However, as mentioned earlier, any other combination of locating pin eccentrics and rings can be used depending upon the total eccentric and alignment required.

The insulator block 10 is installed as follows. The amount of adjustment required is usually calculated by those involved in heavy vehicle alignment servicing using, preferably, instrumentation establishing the position of the wheel/axle unit with reference to the imaginary longitudinal chassis centre line. The resultant wheel/axle relationship to the centre line or "off-thrust" effect is traditionally measured in mm per meter.

Following analysis of the rear end alignment condition, a suitable specified eccentric insulator block using an appropriate ring with eccentric aperture can be introduced into the vehicle axle suspension system to correct the misalignment condition.

This adjustment means is accomplished by lowering the hollow box unit sufficiently to exchange the original standard "centralised" insulator block and placing the inventive "eccentric" block unit in the correct relationship to move the hollow box unit and accompanying axle end in the desired direction for alignment. The rings used may have their outer diameter stamped with the aperture eccentric which, when assembled, gives a total eccentric from 0–10 mm, by 2 mm increments, resulting in the correct axial relationship of the vehicle axles with the imaginary longitudinal chassis centre line.

The inventive insulation block can be installed in one of two positions i.e. with the pin offset fore or aft depending upon the desired alignment, so as to provide the multi-purpose use as envisaged.

Retention of the ring on the locating pin may be achieved by a variety of methods. However, tack welding is a particularly preferable method to secure a reliable join since it also allows changing of the particular eccentric ring by simply grinding off the tack weld.

It is also envisaged in the present invention that, depending upon the amount of adjustment required to achieve correct alignment of the axle with the longitudinal chassis centre line, the top insulator block may also be replaced with an "eccentric" insulator block of the present invention.

I claim:

1. A method for altering axle orientation of a camel-back suspension arrangement, said suspension arrangement comprising a leafed spring, a hollow box unit attached to said axle and an insulator block, held by said box unit, resiliently connecting said leafed spring to said axle, said insulator block comprising a resilient base means, a locating pin and a ring, wherein said locating pin projects from said resilient base means eccentrically of an in-use vertical axis of said resilient base means, said ring having an eccentric aperture therethrough for receipt of said locating pin, the outer circumference of said ring mating with an aperture of said leafed spring, said method comprising placing the ring over said locating pin and inserting the insulator block into the leafed spring, thereby altering the position of said resilient base means and said axle relative to said leafed spring.

2. A method as claimed in claim 1, wherein said pin is eccentric by 4 mm from said axis and a set of rings is provided with apertures set at 0, 2, 4 and 6 mm eccentric from the centre of said ring.

3. A method as claimed in claim 1, wherein said pin is eccentric by 5 mm from said axis and a set of rings is provided with apertures set at 1, 3 and 5 mm eccentric from the centre of said ring.

4. A method as claimed in claim 1, wherein said ring is welded in position on said locating pin.

5. In combination with a camel-back suspension arrangement, said suspension arrangement comprising a leafed spring, a hollow box unit attached to an axle and an insulator block comprising resilient base means, said block being held by said hollow box unit and resiliently connecting said leafed spring with said axle, a system for altering axle orientation of the suspension arrangement, said system comprising a locating pin projecting from the resilient base means eccentrically of an in-use vertical axis of said resilient base means and a ring having an eccentric aperture therethrough for receipt of said locating pin, the outer circumference of said ring mating with an aperture in said leafed spring such that in use said system is adjustable to alter the position of said resilient base means and said axle relative to said leafed spring.

6. An apparatus as claimed in claim 5, wherein said pin is eccentric by 4 mm from said axis and a set of rings is provided with apertures set at 0, 2, 4 and 6 mm eccentric from the centre of said ring.

7. An apparatus as claimed in claim 5, wherein said pin is eccentric by 5 mm from said axis and a set of rings is provided with apertures set at 1, 3 and 5 mm eccentric from the centre of said ring.

8. An apparatus as claimed in claim 5, wherein a bottom surface of said insulator block mates with a complementary lower surface of said box unit to prevent movement of said insulator block in said box unit.

9. An insulator block set for altering axle orientation of a camel-back suspension arrangement, said set comprising a resilient base means having an axis, a locating pin projecting from said resilient base means eccentrically of an axis of said resilient base means and at least one ring, said ring having an eccentric aperture therethrough for receiving said locating pin and an outer circumference for fitting in an aperture in a leafed spring of said suspension arrangement.

10. An insulator block set as claimed in claim 9, said set comprising a locating pin eccentric by 4 mm from said axis and a group of rings with apertures set at 0, 2, 4 and 6 mm eccentric from the centre of said ring.

11. An insulator block set as claimed in claim 9, wherein said set comprises a locating pin eccentric by 5 mm from said axis and a group of rings with apertures set at 1, 3 and 5 mm eccentric from the centre of said ring.

12. An insulator block set as claimed in claim 9, wherein a bottom surface of said resilient base means mates with a complementary lower surface of said box unit to prevent movement of said resilient base means in said box unit.

* * * * *